United States Patent

[11] 3,628,043

[72] Inventors Werner Ullmann;
Franco Donati, both of Locarno;
Gianfranco Tortelli, Ascona, all of Switzerland
[21] Appl. No. 39,383
[22] Filed May 21, 1970
[45] Patented Dec. 14, 1971
[73] Assignee A.G. fur Industrielle Elektronik Agie
Losone B. Locarno
Losone-Locarno, Switzerland
[32] Priority Sept. 27, 1966
[33] Switzerland
[31] 13960/66
Original application Sept. 18, 1967, Ser. No. 668,619, now Patent No. 3,562,619, dated Feb. 9, 1971. Divided and this application May 21, 1970, Ser. No. 39,383

[54] CIRCUIT ARRANGEMENT FOR THE CONTINUOUS CURRENT SUPPLY OF CONSUMERS WITH ASYMMETRICAL LOAD
7 Claims, 9 Drawing Figs.
[52] U.S. Cl. ................................................. 307/87

[51] Int. Cl. .................................................. H02j 1/00
[50] Field of Search ............................................. 307/57, 85, 86, 87, 64, 66, 43, 44, 51, 52, 60; 235/151 F

[56] References Cited
UNITED STATES PATENTS
3,493,778 2/1970 Cutler et al. .................. 307/87
3,497,711 2/1970 Wuttig ......................... 307/87

*Primary Examiner*—Herman J. Hohauser
*Attorney*—Werner W. Kleeman

ABSTRACT: Apparatus for influencing or controlling the vectors of output voltages from a direct current supply device feeding a multiconductor alternating current transmission system. The total voltage vector for each conductor is generated from two partial voltage vectors. Control of the magnitude of the total voltage vector is effected by phase-shifting the partial voltage vectors, each partial voltage vector being phase-shifted through the same angular magnitude but in opposite angular direction. In this manner, the total voltage vector for each conductor is maintained in a constant phase position even during automatic regulation and in the presence of an asymmetrical load.

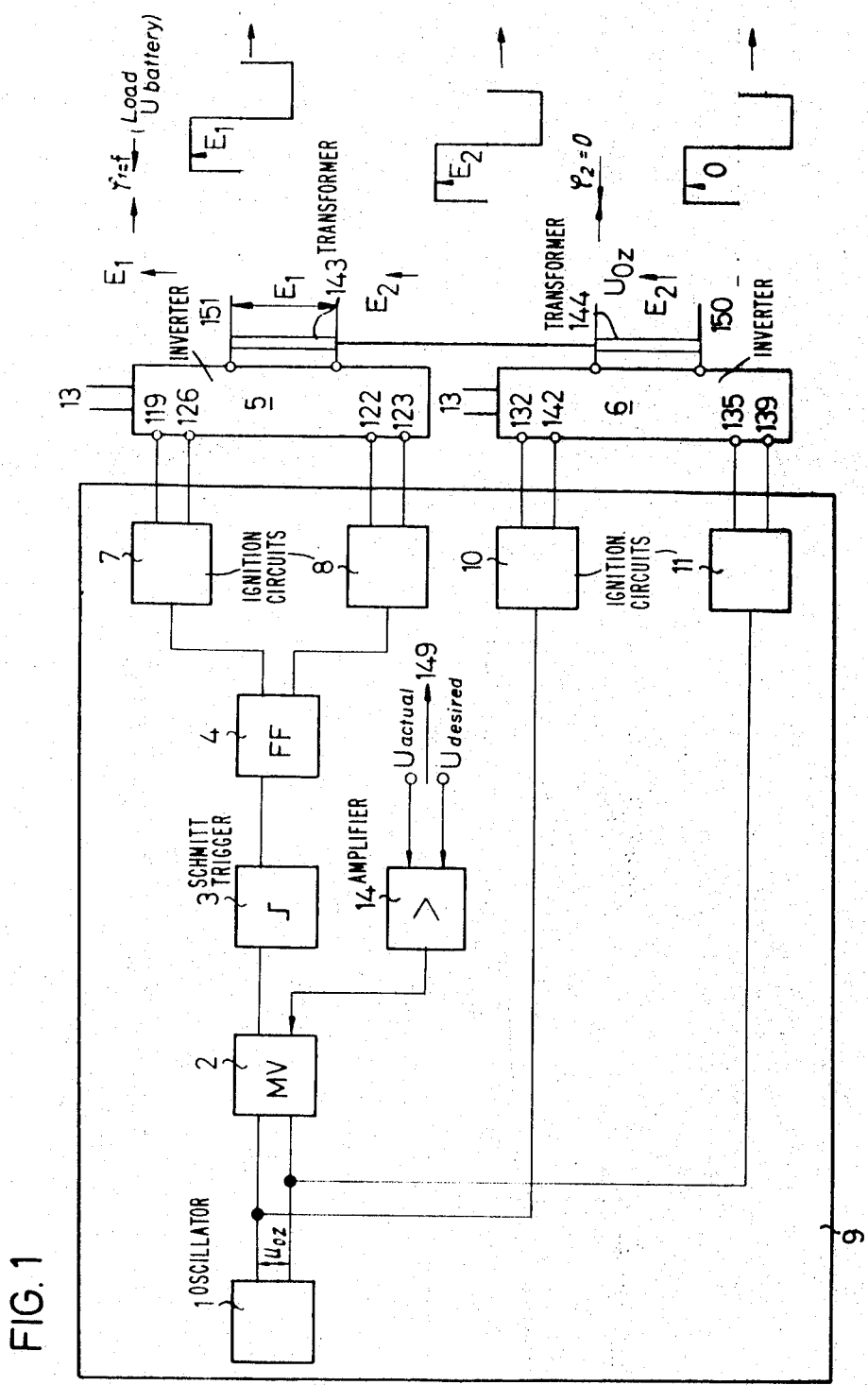

INVENTOR
WERNER ULLMAN
FRANCO DONATI
GIANFRANCO TORTELLI
BY *Werner H. Kleeman*
ATTORNEY

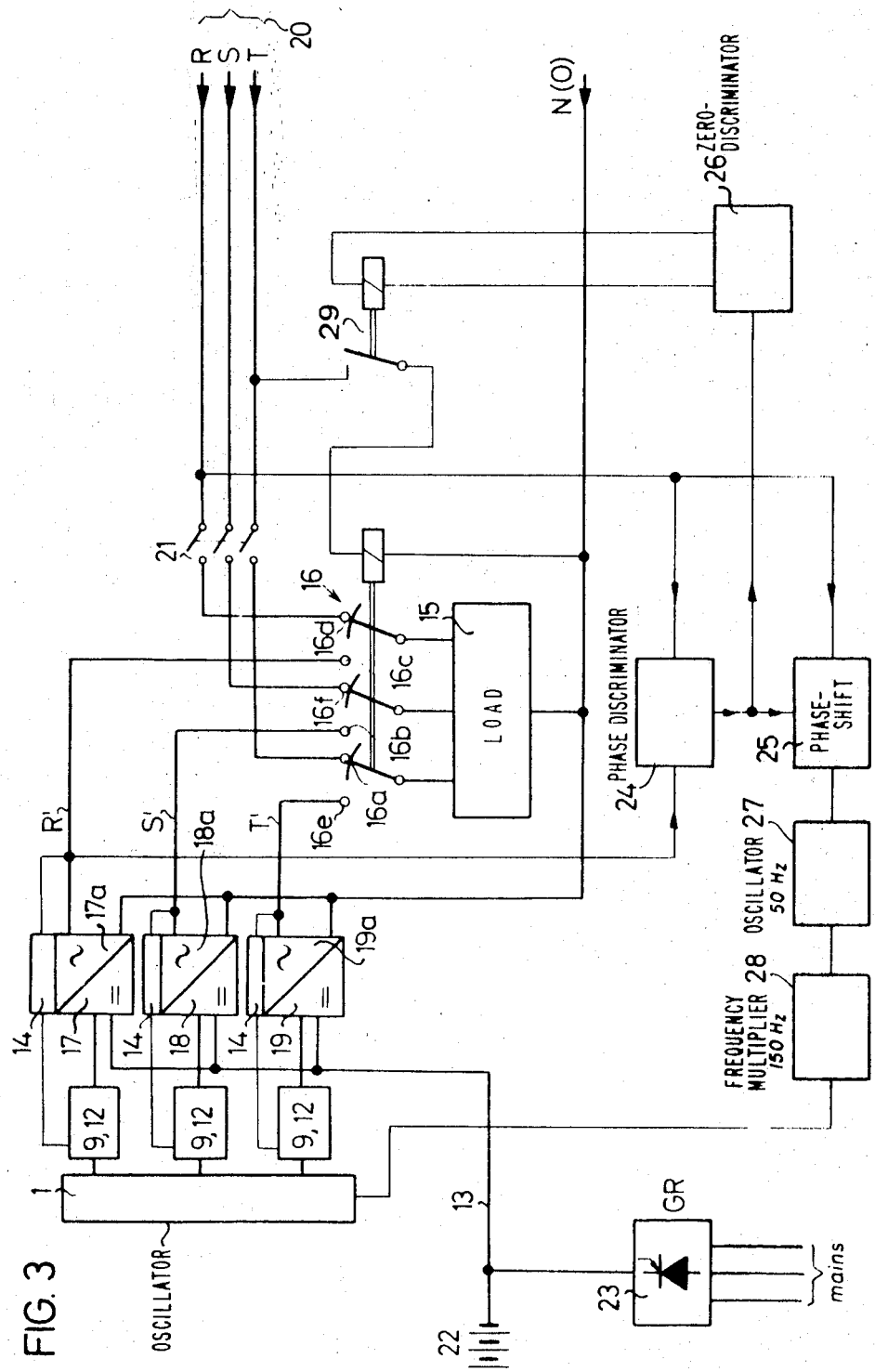

CIRCUIT ARRANGEMENT FOR THE CONTINUOUS CURRENT SUPPLY OF CONSUMERS WITH ASYMMETRICAL LOAD

BACKGROUND OF THE INVENTION

The present application is a divisional application of our commonly assigned, copending U.S. application, Ser. No. 668,619, now U.S. Pat. No. 3,562,619 entitled "Method And Apparatus For Influencing The Output Voltages of Current Supply Installations."

The present invention relates to an improved circuit arrangement for the continuous current supply of at least one consumer providing an asymmetrical load. Such circuit arrangement is of the type incorporating a direct-current voltage source, control devices and static converters which receive ignition pulses from such control devices, and further, wherein the consumer or consumers can be connected in parallel to a further current supply network or at least one other similar type circuit arrangement upon coincident phase position of the voltages.

Loads drawing relatively high power preferably receive their current supply through a polyphase system, for example, a three-conductor transmission system. Such a system has a predetermined voltage and a particular frequency. When loads of different voltage or different frequency requirements are connected to an existing supply system, appropriate converting means must be connected in front of the load. Such converting means are likewise required when a permanent current supply to polyphase loads is to be provided, for example, by means of a battery, in the event of failure of the normal supply system or in the event of any other disturbances therein such as harmonics, switching surges, etc. These converting means are either rotary converters consisting of a generator and a motor, or static converters consisting of a direct-current source or a rectifier arrangement and inverters. Such converters operate satisfactorily if a symmetrical load is connected within the multiconductor system. However, if an asymmetrical load is present within the multiconductor system, that is, if a different load is connected or disconnected between each conductor, an asymmetry of the angles present between the vectors occurs in relation to the external loading because of the appreciable internal impedances of the inverters. If differential loads, for example those presented by a radar apparatus or electrical laboratory apparatus or large-scale data-processing installations, are connected to the multiconductor system, costly regulating precautions must be undertaken, because such loads depend upon a satisfactory current supply with constant values of the polyphase relations despite any asymmetrical loading.

SUMMARY OF THE INVENTION

Accordingly, it is a primary object of the present invention to provide for the positive current supply of complicated loads. The supply of one or more loads with alternating current or alternating voltage, respectively, can be achieved through the agency of a two-conductor or multiconductor transmission system with optional frequency.

By virtue of the present invention there is not only eliminated the asymmetrical load, but rather, there is especially provided a current supply system which is optionally connected in parallel with an existing further alternating-voltage network or with other similar type circuit arrangements for the continuous current supply, whereby the frequency of the output alternating-current voltages can be adjusted as desired and according to choice, depending upon the load requirements.

The principle of a current supply system consisting of rectifiers and inverters for feeding supply conductors, the inverters receiving striking or ignition pulses from striking circuits controlled by an oscillator, is adequately set forth and illustrated in British Pat. No. 1,095,029 and in Swiss Pat. No. 444,265.

Proceeding from this principle, the present inventive apparatus fulfills the aforementioned requirements for complicated loads, in that the inventive circuit arrangement is manifested by the features that each pair of inverters is provided with a device for influencing the output voltage vectors and therefore eliminating the asymmetrical load, and that for all of the pairs of inverters there is provided an apparatus for controlling the phase position of the voltages appearing at the output side of the pairs of inverters as a function of the voltage of a further current supply network or the same frequency-determining circuit arrangement.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates a part of a known circuit arrangement;

FIG. 3 illustrates the entire circuit arrangement of the invention in connection with the detailed arrangement of FIG. 2.

DESCRIPTION OF THE PREFERRED EMBODIMENTS

Figure 1A:
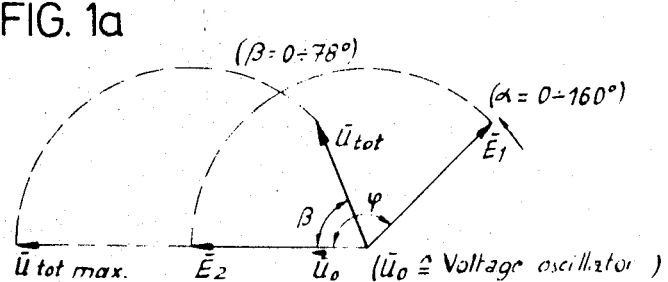
FIGS. 1a, 1b, and 1c show the vector diagrams of the individual conductor voltages in a three-conductor transmission system.

Describing now the drawings, it will be recognized that in FIG. 1 an oscillator 1 is arranged in a control device 9. Oscillator 1 controls a monostable multivibrator 2 which, via a Schmitt-trigger 3, acts upon a flip-flop circuit 4. The latter delivers control pulses to ignition circuits 7, 8. Oscillator 1 is directly coupled to ignition circuits 10, 11. The ignition circuits 7, 8 and 10, 11 are electrically coupled with inverters 5 and 6 respectively. Controlled rectifiers 119, 126, 122, 123 in the inverter 5 are ignited in pairs in accordance with the ignition impulses, so that due to the direct-current source 13, there results a rectangular or square wave-shaped partial voltage $E_1$. This voltage $E_1$ is phase displaced by the angle $\Phi$ with respect to the control impulse $U_{ox}$ of the oscillator 1. The magnitude of this phase displacement is determined by the differential signal which differential amplifier 14 delivers to monostable multivibrator 2. The amplifier 14 is coupled with a load 149 and continually compares the reference voltage with the actual voltage at the load. The magnitude of the differential signal, and thus, the phase displacement of the voltage $E_1$ with respect to the voltage $U_{ox}$ is proportional to the deviation of the reference voltage from the actual voltage. The inverter 6 composed of controlled rectifiers 132, 142, 135, 139, is controlled by the ignition impulses from the ignition circuits 10, 11. The partial voltage $E_2$ at the output of inverter 6 and produced from the direct-current voltage source 13, is likewise of square wave shape but is not phase displaced with respect to the control impulses of the oscillator 1. With additive coupling of both of these partial voltages $E_1$, $E_2$, for instance by means of transformers 143, 144 at the outputs of the inverters 5, 6, there results a stepped voltage from which it is possible to form a sinusoidal voltage by means of, for instance, a subsequently connected filter arrangement. This alternating-current voltage appears across the conductors 150 and 151 of a two-conductor transmission system. This system is explained in greater detail in British Pat. No. 1,095,029 and in the Austrian Pat. No. 257,746, so that only the essential details have been considered herein.

FIG. 1a shows the vector $U_{tot}$ of the sinusoidal alternating voltage for two-conductor transmission system. The vector is obtained by vectorial addition of the two component voltage vectors $E_1$, $E_2$, the vector $E_1$ having the phase angle $\Phi$ in relation to the vector $E_2$. The voltage vector $U_{tot}$ is at an angle $\beta$ in relation to the voltage vector $U_{oz}$ of the oscillator 1. In order that the voltage $U_{tot}$ may be maintained constant in its value with variable voltage conditions at the load 149, the angle $\Phi$ of the component voltage $E_1$ is changed through the differential amplifier 14, the control unit 9 and the inverter 5. At the same time, however, the angle $\beta$ also changes. With a two-conductor arrangement, however, this is not critical. The disadvantage that the phase $\beta$ of the voltage vector $U_{tot}$ also changes on voltage regulation because of conditions at the load, takes effect only with a three-conductor transmission system and with asymmetrical loading.

Figure 1B:
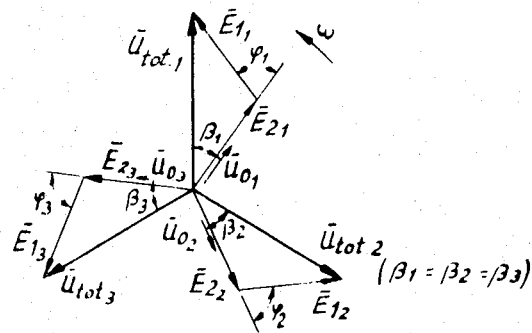

For a better understanding, the three voltage vectors $U_{tot1}$, $U_{tot2}$ and $U_{tot3}$ between the neutral conductor and the conductors 1, 2, 3 are shown in FIG. 1b. These vectors of the total voltage are at 120° to one another. The vector $U_{tot1}$ is composed of the component vectors $E_{11}$, $E_{21}$ of the two inverters acting on the conductor 1. The vector $U_{tot2}$ is obtained by vectorial addition of the two component voltages $E_{12}$, $E_{22}$. The later component voltages are generated by the two inverters acting on the conductor 2. The vector $U_{tot3}$ is formed of the vectors $E_{13}$, $E_{23}$ of the two inverters acting on the conductor 3. Therefore, six inverters are present for the formation of the circular rotating field, the inverters acting in pairs on one conductor. In each pair, only one inverter can carry out the phase shift through the angle $\Phi$. The voltage vectors $E_{11}$, $E_{12}$, $E_{13}$ thus form the phase angles $\Phi_1=\Phi_2=\Phi_3$ With their associated voltage vectors $E_{21}$, $E_{22}$, $E_{23}$. With the symmetrical load assumed in FIG. 1b, these angles are $\Phi_1=\Phi_2=\Phi_3$. Consequently, the angles $\beta_1$, $\beta_2$, $\beta_3$ between the vectors $U_{tot1, 2, 3}$ of the individual conductor voltages and the vectors of the oscillator voltages $U_{01}$, $U_{02}$, $U_{03}$, are equal. Each pair of inverters acting on one conductor is therefore constructed as illustrated in FIG. 1. Consequently it comprises one oscillator and one control unit with striking circuits. The oscillators apply their control pulses at intervals of 120° to the multivibrator 2, so that a circular rotating field according to FIG. 1b with an angular velocity $\omega$ is set up. The voltages between the individual conductors, which are also known as interlinked voltages, are equal in their value and in their angle to one another.

This is apparent from FIG. 1b if the peaks of the voltage vectors $U_{tot1}$, $U_{tot2}$, $U_{tot3}$ are joined together. This has not been done in the drawing in order not to impair its clarity. The described conditions also remain constant on regulation in dependence upon symmetrical voltage changes at the load, because the angles $\Phi_1$, $\Phi_2$, $\alpha_3$ are changed in the same way. Consequently, the angles $\beta_1$, $\beta_2$, $\beta_3$ are always equal to one another.

Figure 1C:
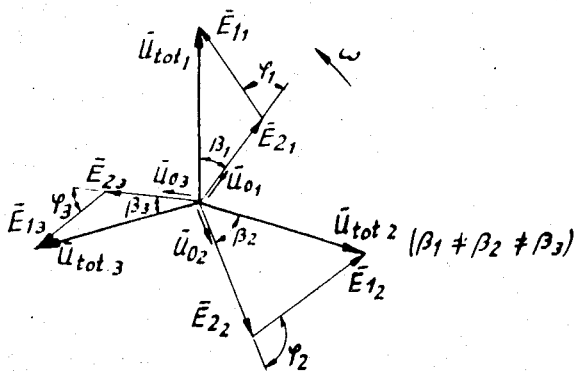

If an asymmetrical load, however, is applied between the individual conductors in the three-conductor system, a vector diagram according to FIG. 1c is obtained, in which the vectors of the component voltages $E_{11}$, $E_{21}$ between the conductor 1 and the neutral conductor, $E_{12}$, $E_{22}$ between the conductor 2 and the neutral conductor, and $E_{13}$, $E_{23}$ between the conductor 3 and the neutral conductor have been added in the same way therein to form the vectors $U_{tot1}$, $U_{tot2}$, $U_{tot3}$ of the total voltage existing in each conductor. In accordance with the asymmetrical loading of each conductor, the angle $\Phi$ is automatically regulated through the differential amplifier 14 and the control unit 9 with its striking circuits and through one of the inverters associated in pairs with each conductor. The angles $\Phi_1$, $\Phi_2$, $\Phi_3$ are unequal, so that the angles $\beta_1$, $\beta_2$, $\beta_3$, are also unequal. In addition, the vectors of the component voltages no longer have the same value. This is apparent from the different lengths of these vectors, in contradistinction to FIG. 1b. FIG. 1c further shows that, due to automatic regulation, the individual conductor voltage voltage vectors $U_{tot1}$, $U_{tot2}$, $U_{tot3}$ are regulated to the same amount, but the interlinked voltages which represent the vectorial combination between the peaks of the individual conductor vectors are no longer equal to one another. Therefore, a circular rotating field which rotates with the angular velocity $\omega$ is no longer present.

Figure 2:
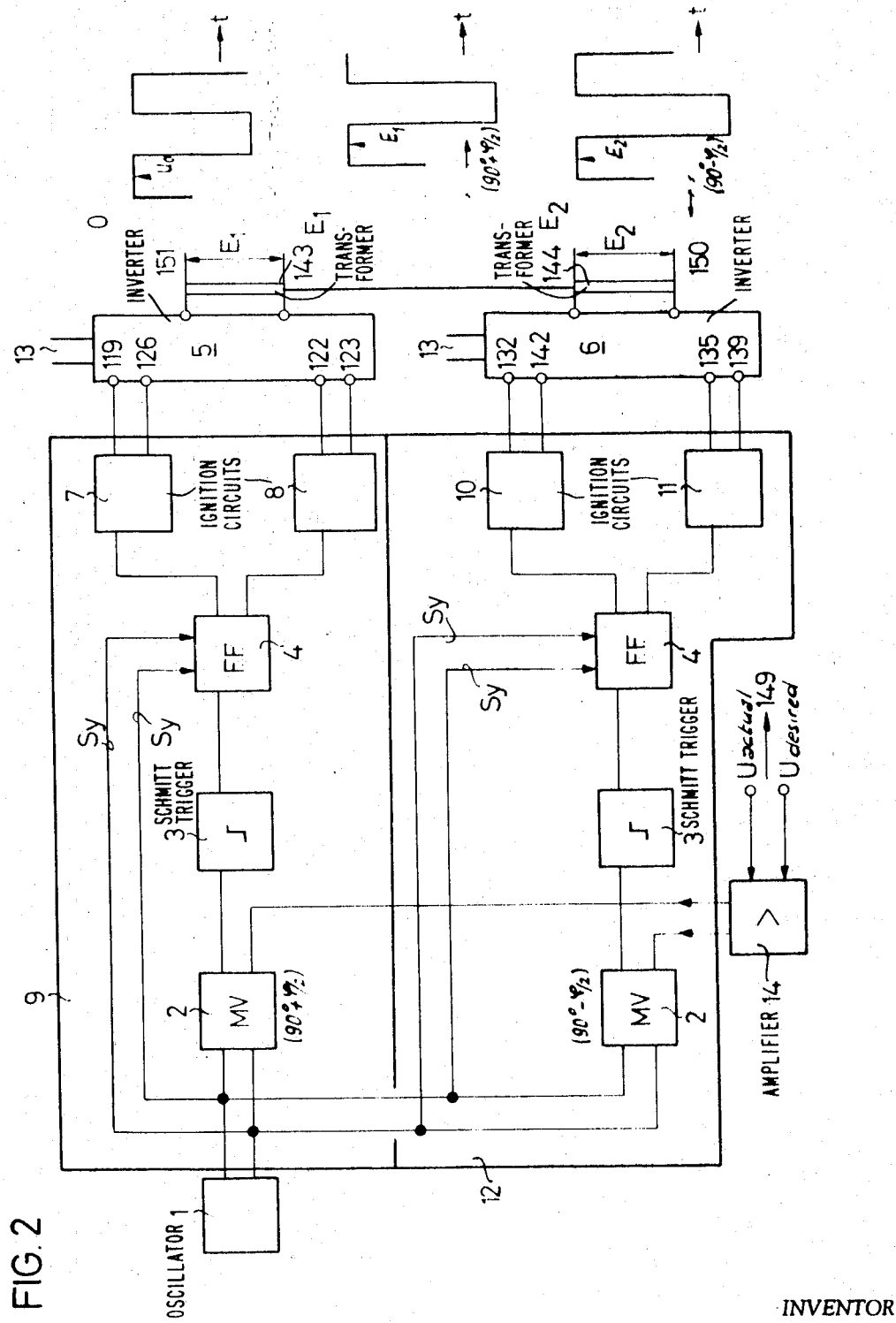
FIG. 2 illustrates in detail the circuit arrangement for carrying out one aspect of the invention.

FIG. 2 illustrates a circuit arrangement according to the instant invention in which an oscillator 1 acts on two control units, 9, 12. Each control unit is of like construction. Therefore, the same reference numerals have been chosen. The oscillator controls a monostable multivibrator 2, a Schmitt-trigger 3, a flip-flop circuit 4, and the striking circuits 7, 8, 10, 11 in the two control units 9, 12. The latter apply striking pulses to controllable rectifiers 119, 126, 122, 123 in the inverter 5 and to controllable rectifiers 132, 142, 135, 139 in the inverter 6. The inverters 5, 6 are connected to a direct-current source 13. Connected to the monostable multivibrator 2 in the control unit 9, 12 is the differential amplifier 14, which is connected to the load or loads 149. Depending upon the difference between the desired and actual voltages at the load, the control pulses are phase-shifted in relation to the pulses of the oscillator 1 in each monostable multivibrator 2. The differential amplifier 14 so controls the two monostable multivibrators 2 that the upper one applies control pulses shifted by the angle 90°+$\Phi$/2 and the lower one applies control pulses shifted through the angle 90°−$\alpha$/2 to the sequentially connected Schmitt-trigger 3, the flip-flop circuit 4 and the striking circuits 4, 10. These striking circuits apply their striking pulses to the rectifiers 119, 126 in the invertor 5 and to the rectifiers 132, 142 in the inverter 6. The other striking circuits 8, 11 apply striking pulses staggered through 180° to the rectifiers 122, 123 in the inverter 5 and to the rectifiers 135, 139 in the inverter 6, in dependence upon the first-mentioned striking circuits. Therefore, both in the inverter 5 and in the inverter 6, rectangular component voltage $E_1$, $E_2$ are produced from the direct-current source 13, which are phase-shifted in relation to the control pulse in the oscillator 1 by the phase angle 90°+$\Phi$/2 and 90°−$\Phi$/2. Each inverter has a transformer 143, 144 as its output. There is set up at the transformer 143, the component voltage $E_1$, and at the transformer 144, the component voltage $E_2$. For a better comparison, the voltage $U_0$ of the control pulses of the oscillator 1 has also been shown. Since the two component voltages $E_1$, $E_2$ are added together because of the series connection of the transformers 143, 144, a stepped total voltage is obtained between the conductor 151 and the neutral conductor 150. A sinusoidal conductor voltage is produced from the stepped voltage by a nonillustrated sequentially connected filter.

Figure 2A:
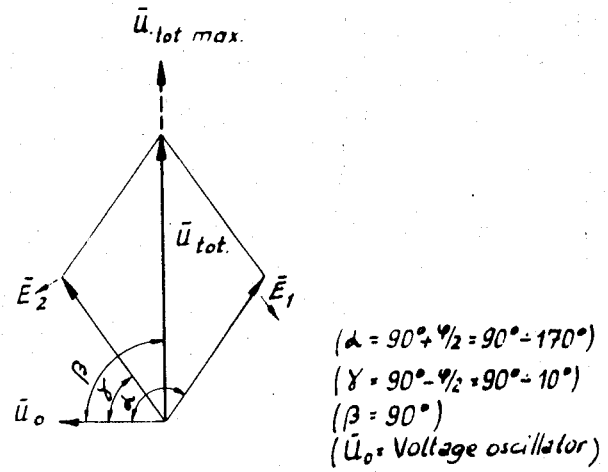
FIGS. 2a, 2b, and 2c depict the vector diagrams of the individual conductor voltages in a three-conductor transmission system.

In FIG. 2a, the voltage vector $U_{tot}$ for the conductor voltage between the conductor 151 and the neutral conductor 150 is shown. The two vectors of the component voltages $E_1$, $E_2$ of the inverters 5, 6 are arranged symmetrically in relation to the voltage vector $U_{tot}$. The vector of the component voltage $E_1$ has a phase shift angle $\alpha=90°+\Phi/2$ and the vector of the component voltage $E_2$ has a phase shift angle $\gamma=90°-\Phi/2$ in relation to the vector of the oscillator pulse $U_0$. Depending on the regulation by the differential amplifier 14, the vector of the component voltage $E_1$ is shifted through the angle $\alpha$ between 90° and 170°. The same takes place with the vector of the component voltage $E_2$. The angle $\gamma$ lies between 90° and 10°. The angle $\beta$ between the vector of the conductor voltage $U_{tot}$ and the vector of the oscillator voltage $U_0$, however, always remains constant at 90°, because the two vectors of the component voltages always change symmetrically in relation to the vector $U_{tot}$.

Figure 2B:
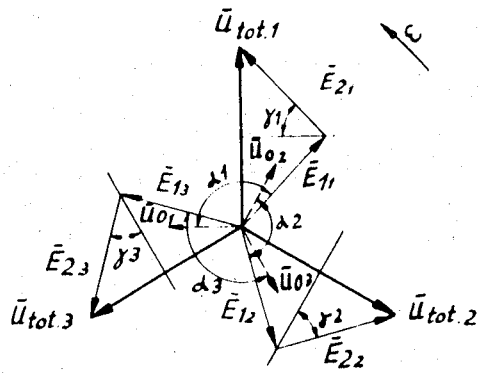

FIG. 2b shows the vector diagram in a three-conductor transmission system with symmetrical loading in each conductor. The three-conductor transmission system is produced by triplicating the circuit arrangement of FIG. 2. It is unnecessary for the oscillator 1 to also be triplicated. Alternatively, a single oscillator 1 for the control units 9, 12 may be provided in triple construction. It is essential for the oscillator or oscillators to emit three control pulses at intervals of 120° with a fixed frequency of, for example 50 c./s. In the case of a three-conductor system, three differential amplifiers are employed, so that the difference between the actual and desired voltages in each conductor is separately determined and utilized for the regulation. In the vector diagram of FIG. 2b, the same reference numerals are employed for the component voltages E of the total voltages $U_{tot}$ and the oscillator pulse voltages $U_0$ for the three conductors 1, 2 and 3 as in FIG. 1b. In accordance with the regulation of the differential amplifiers 14, the angles $\alpha_1$, $\gamma_1$ for the conductor 1 and the angles $\alpha_2$, $\gamma_2$ for the conductor 2, and the angles $\alpha_3$, $\gamma_3$ for the conductor 3 are so adjusted that the vector $U_{tot1}$ of the voltage in the conductor 1, the vector $U_{tot2}$ of the voltage in the conductor 2, and the vector $U_{tot3}$ of the voltage in the conductor 3 are always perpendicular to the associated vector of the oscillator voltage $U_{01}$, $U_{02}$, $U_{03}$. The absolute values of the vectors for the component voltages E and for the total voltages $U_{tot}$ are the same for each conductor. The same applies to the interlinked voltages between two conductors. A circular rotating field is thus produced, which rotates at the angular velocity $\omega$.

Figure 2C:
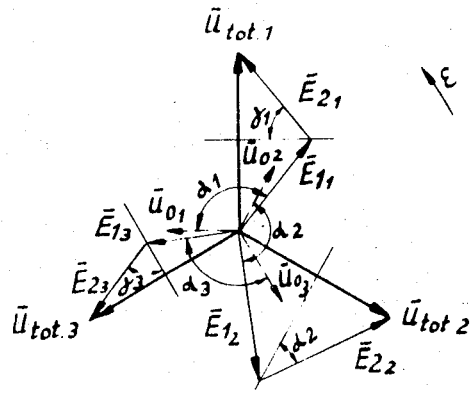

However, if an asymmetrical load is present in a three-conductor system constructed in accordance with the instant invention, the conditions in each conductor do not change despite the regulation by the differential amplifiers 14. This is apparent from FIG. 2c, in which a highly asymmetrical loading is shown. The same circuit arrangement is provided as has been briefly explained with reference to FIG. 2b. It is thus a question of a triple arrangement of the circuit arrangement of FIG. 2. For the vector diagram of FIG. 2c, the same reference numerals have been chosen. In the case of the asymmetrical loading, the absolute values of the component voltage vectors E and their angles $\alpha$ and $\gamma$ differ considerably in the individual conductors because of the automatic regulation by the differential amplifiers 14. Nevertheless, the interlinked voltages between the individual vectors of the conductor voltages $U_{tot}$ are constant. With the circuit arrangement according to FIG. 2, therefore, the great advantage is obtained that the voltages remain constant both in their angle and in their absolute value regardless of the differing regulation in each conductor.

In the foregoing, reference has been made to the regulation of the asymmetrical load through the differential amplifiers 14. The adjustment of the frequency of the alternating voltage appearing at the output of the inverters has not been mentioned. Of course, the oscillator 1 may apply its control pulses to the control unit with any desired repetition frequency, so that loads such as radar equipment, for example, may be directly connected through a multiconductor system. Since the oscillator 1 can continuously change its repetition frequency, it is also possible to control the speed of one or more asynchronous or synchronous generators.

In FIG. 3, there is shown a practical example of a circuit arrangement according to the invention. There is denoted by 15 a consumer or load which may be connected to the circuit arrangement through a three-conductor transmission system. The load represents, for example, a computer in which a particularly high asymmetrical loading is often present between the three conductors. The computer 15 may be connected both to the conductors R', S', T' of the inverter pairs 17, 18, 19 and to the conductors R, S, T of an existing supply system 20 through a three-pole switch 16. This changeover is of advantage when the load 15 is to be energized. Since the circuit-closing current may reach a value which is a number of times (even more than six times) the value of the rated current, the voltage would drop by more than 30 percent during the circuit-closing time in the case of current supply from the inverter pairs 17, 18, 19. The computer, however, could comprise a supervisory device which immediately cuts off the current supply at a voltage reduction of about 30 percent provided only that the reduction lasts one cycle (for example at 50 c./s. or 20 ms.) or longer. In order to avoid this cutoff, the computer 15 is first connected to the supply system 20. This is effected by closing of the switch 21. The changeover switch 16 lies in the illustrated position at the contacts 16a, 16c, 16d.

In order to ensure a synchronous changeover, oscillator 27 is permanently connected to the conductor R of the supply system 20 and applies control pulses to the frequency multiplier 28 at a repetition frequency of, for example, 50 c./s. There is set up at the output of this frequency multiplier the third harmonic oscillation at a frequency of 150 c./s. which is applied to the three oscillators 1. These three oscillators are constructed in this example as a so-called ring counter. The outputs of the ring counter are connected to the control units 9, 12. The construction of the control units is apparent from FIG. 2. There are set up at each of the three outputs, control pulses of 50 c./s. with a mutual shift of 120°. The inverter pairs 17, 18, 19 thus receive striking pulses of 50 c./s. staggered at 120° and, as already described with reference to FIG. 2, generate from the direct-current supply system 13, which may be a direct-current source 22 and/or a rectifier arrangement 23 supplied by an AC voltage source, the desired conductor voltages and interlinked voltages according to FIG. 2b. As already described with reference to FIG. 2, there are provided at the outputs of the inverter pairs 17, 18, 19 transformers whose secondary windings are connected, for example, in star. These transformers as well as filters are indicated in FIG. 3 only by the references 17a, 18a, 19a. In FIG. 3, the conductors R', S', T' are connected in star with the neutral conductor N(0). The load 15 is, for example, also connected in star. Provided at each pair of inverters is a differential amplifier 14 with its connection between the conductors and the control units 9, 12.

It will now be assumed that the inverter pairs 17, 18, 19 generate the desired voltage under no load. A phase discriminator 24 situated between a conductor, for example R, of the supply system 20 and the corresponding conductor, for example R' of the circuit arrangement monitors whether the voltage vectors of the supply system and of the circuit arrangement have the same angle. If there is no agreement between the angles, the phase discriminator 24 applies a difference signal to the phase shifter 25, whereby the oscillator 27 is so regulated that the inverter pairs 17, 18, 19 generate at the conductors R', S', T' conductor voltages and interlinked voltages whose values and angles are the same as those of the conductor voltages and interlinked voltages at the conductors R, S, T of the supply system 20. When agreement is reached, the zero discriminator 26 receives a signal from the phase discriminator 24. The relay 29 receives current and energizes the relay coil of the changeover switch 16 by means of its contact. The changeover switch 16 then changes over from the supply system 20 to the inventive circuit arrangement. This changeover takes place without any interruption, the conductors R, S, T of the supply system 20 being briefly connected together with the conductors R', S', T' of the circuit arrangement through the contacts 16e, 16a; 16b, 16f; 16c, 16d during the changeover action, which connection may be brought about by means of a special contactor or by two independent contactors. As soon as the changeover switch lies on the contacts 16e, 16b, 16c, the computer 15 receives its current supply through the circuit arrangement and is thus independent of the mains supply system. The switch 21 remains closed. The oscillator 27 continues to be synchronized with the supply system 20 through the phase discriminator 24 and the phase shifter 25. In this case, one speaks of a mains-commutated inverter. If the computer 15 must continue to be operated even during a sudden failure of the mains, it is readily possible to sever the oscillator 27 from its mains control and to construct it as a freely oscillating oscillator. In this case, one speaks of a self-commutating inverter, because the oscillator 27 applies its control pulses to the striking circuits of the inverters 17, 18, 19 independently of the mains. This possibility of a self-commutating inverter and thus the function thereof as a permanent current supply is not, however, shown in detail in FIG. 3. In any case, the differential amplifiers 14 regulate any asymmetrical load between the conductors R', S', T', as already described in FIG. 2. It is therefore immaterial whether the system functions as a mains-commutated inverter or as a self-commutating inverter. The phase shifter 25 has a fixed phase shift of 90° in relation to the voltage vectors in the conductor R of the supply system 20. This is necessary because of the special voltage regulation in the circuit arrangement.

Finally, mention is still made of the fact that the network 20 can just as well be a circuit arrangement as such has been described in detail in FIG. 2 and generally in FIG. 3. If a particularly complicated load 15 requires a current supply, then, a number of such similar type circuit arrangements can be initially connected or disconnected in parallel with one another. In this manner there is provided a so-called building block principle for the continuous current supply.

It should now be apparent that the objects set forth at the outset of this specification have been successfully achieved.

What is claimed is:

1. A circuit arrangement for the continuous current supply of at least one consumer providing an asymmetrical load means, said circuit arrangement comprising a source of direct-current, a plurality of static inverter means defining predetermined pairs of inverter means, control means for said plurality of inverter means for delivering ignition impulses to said inverter means wherein the load means can be connected in parallel to a further current supply network or at least one other similar type circuit arrangement with coinciding phase position of the voltages, each pair of said inverter means being provided with a device for influencing the output voltage vectors to thereby eliminate the asymmetrical load, and means provided for all pairs of inverter means for controlling the phase position of the voltages appearing at the output side of the pairs of inverter means as a function of the voltage of the further current supply network or the frequency-determining similar type circuit arrangement.

2. A circuit arrangement as provided in claim 1, wherein the means for controlling the phase position is a phase discriminator which is coupled with an associated conductor of the further current supply network and the pair of inverter means, a phase displacing device coupled after the phase discriminator as well as a further oscillator with a subsequently connected frequency multiplier.

3. A circuit arrangement as defined in claim 2, wherein said frequency multiplier is directly coupled with oscillators provided for delivering control impulses to the control means of the pair of inverter means, each of said oscillators delivering control impulses which exhibit a predetermined common frequency and a predetermined mutual time displacement.

4. A circuit arrangement as defined in claim 2, further including a null discriminator provided at the output side of said phase discriminator, said null discriminator actuating a relay means for switching the load from the further current supply network to the associated conductors of the pair of inverter means.

5. A circuit arrangement as defined in claim 1, wherein the device for influencing the output voltage vectors to thereby eliminate the asymmetrical load consists of a differential amplifier means disposed between the load and a pair of control means for said inverter means, said amplifier means upon a difference between the actual-value of the voltage and the reference-value of the voltage at the load delivering a signal to a multivibrator provided in each control means for displacing the phase angle between the ignition impulses and the control impulses of the oscillator delivered to the pairs of inverter means, whereby the ignition impulses delivered from one control means to the associated inverter means is displaced through the phase angle $+\Phi/2$ and the ignition impulses delivered from the other control means to the other inverter means associated therewith is displaced through the phase angle $-\Phi/2$.

6. A circuit arrangement as defined in claim 1, wherein each control means includes a monostable multivibrator, a Schmitt-trigger, a flip-flop circuit, as well as two ignition circuits for the control of the pairs of inverter means, each of which is provided with four controlled rectifiers, wherein in each instance, a pair of said controlled rectifiers is connected to an ignition circuit.

7. A power supplying apparatus for a multiconductor transmission system connected to a load, said power supplying apparatus comprising:
a source of direct-current;
a plurality of inverter means for connecting said source of direct-current to said multiconductor transmission system;
control means for said plurality of inverters, said control means delivering ignition impulses to said inverters, each control means including a multivibrator;
oscillator means for providing control impulses to said multivibrators; and
differential amplifier means for providing an error signal indicative of the difference between a desired load voltage and the actual load voltage, said differential amplifier being connected between said load and said multivibrators of said control means, said error signal causing a phase-shift of said ignition impulses of each control means relative to the control impulses of said oscillator means;

said apparatus further including an alternating current supply system selectively connectable to said multiconductor transmission system and synchronizing means for synchronizing said power supplying apparatus with said alternating current supply system, said synchronizing means including a phase discriminator connected between said alternating current supply system and the inverter means outputs to said multiconductor transmission system, a phase shifter connected to an output of said phase discriminator, a phase-shift controlled oscillator means connected to an output of said phase shifter, said phase-shift controlled oscillator means influencing said oscillator means for providing control impulses, and a zero-phase discriminator means connected to said output of said phase discriminator for selectively connecting and disconnecting said alternating current supply system with said multiconductor transmission system.

* * * * *